United States Patent [19]

Ingber et al.

[11] Patent Number: 5,579,905
[45] Date of Patent: Dec. 3, 1996

[54] GIFT PACKAGE INCLUDING CANDY

[76] Inventors: Noam Ingber, Annastrasse 1, 55124 Mainz, Germany; Amnon Shadmi, 9 Avigur Street, Tel Aviv 69379, Israel

[21] Appl. No.: 429,779

[22] Filed: Apr. 27, 1995

[51] Int. Cl.⁶ ..................................................... B65B 25/24
[52] U.S. Cl. ............................. 206/232; 206/457; 426/5; 426/104
[58] Field of Search ...................... 426/104, 5; 206/457, 206/307, 309, 308.1, 232

[56] References Cited

U.S. PATENT DOCUMENTS 4,461,790  7/1984  Snider .................................. 426/104 X
5,236,725  8/1993  McCormack et al. .............. 426/104 X

OTHER PUBLICATIONS

Dialog (R) File 79: Foods Adlibra 1996 General Mills.

Primary Examiner—Jacob K. Ackun
Attorney, Agent, or Firm—Paul M. Denk

[57] ABSTRACT

A girl package includes a candy CD held in a CD holder. The candy CD is in the shape of an annular disc and has a central hole formed therein. The CD holder includes a base and a transparent cover. The base includes a centrally located securing element sized and shaped to snugly fit in the hole formed in the candy to securely hold the candy CD in the base. The cover includes a card having a front surface and a back surface. The front surface of the card is visible through the cover and contains thereon a preprinted message. The back surface of the card is accessible for writing a personal message thereon. The cover includes inwardly extending fingers to hold the card in the cover.

3 Claims, 1 Drawing Sheet

GIFT PACKAGE INCLUDING CANDY

BACKGROUND OF THE APPLICATION

This invention relates to girl items and in particular to candies, gum, or sweets shaped and packaged as commercial items, such as CD's.

Gift items of different types are given on various occasions to selected people. The problem of gift giving in general is well known in non-industrial consumer markets. There exists a voluminous industry which is busy trying to produce and distribute suitable gift items.

Normally gifts or presents consist of practical items, or various types of edibles with decorative elements or even of a combination of practical and edible items. A large number of these decorative practical items have refined and replaced the original technical use of the practical items. Often the border between technical and gift use overlaps. So we have a large number of primarily decoratively created practical items. Normally, these gift elements are combined. So one may find so-called 'gift baskets' with edibles but which also include little practical items for example: books, cigarette lighters, etc. On the other hand, one will find these practical items accompanied with edibles also, primarily candy, alcohol, etc., which in turn increases the entire gift item's value. It is also well known that girls with extensive decorative packaging—for examples, when mini-objects are included in air balloons—increase the value of the entire girl item. All of these above mentioned combinations should increase the originality and intensify the surprise effect in gift giving. A primary disadvantage of all these kinds of described gift items consists of the fact that the person giving the girl must plan and combine items. In addition, these single gift items themselves can only achieve a limited level of surprise effect; this surprise effect itself must be achieved by the most creative combination of girls. A book in itself has a limited degree of surprise, which is also the case for a box of chocolates. The surprise effect is increased through a creative combination of the items. This will be strengthened through original packaging. However, the single elements quite quickly reach the maximum level of originality and the maximum possibilities for variation. The design on the packaging whose characteristics reveal the enclosed item reduces the surprise effect; a fact which must be observed in the consumer market.

Thus, there exists a basic need for original gift items.

SUMMARY OF THE INVENTION

From the enclosed design, the basic purpose is to create a gift item that will offer an increased originality and a greater surprise effect.

For the technical solution, we take a gift item that is made up of a practical item, which is normally used as such, with a certain packaging and in the packaging situate at least one edible item. For example, a CD made of gum and packaged in a CD holder.

The specialty of this created girl item consists in the application of the actual item to that which the gift receiver expected from the standard packaging. Not the practical item but instead (or as well as) an edible is enclosed.

The concept of the edible within the enclosed design would be the main concept and understood as usable for many kinds of nutritious and enjoyable foodstuffs. It is also not to be limited to possible foodstuffs, but it may include, for example, all edible, chewable, drinkable and any other type of consumable items in their offered form direct or special preparation for use.

This concept of the practical object should also be understood in the further sense of the device; namely, it should include all kinds of technical, practical objects that can be used in the framework of a girl. Today, all kinds of recording devices for entertainment electronics are being offered, for example diskettes, CD's, cassettes and the such. Offered as well are elements of modem electronic usage such as transportable CD players, mobile phones, clocks, and such; books, tools, household items and so forth.

A certain manner of packaging is understood, so records and cassettes and such are enclosed in a recognizable plastic packaging which in the sense of the design can be used in its original or in a very simplified form. All market-known packaging for practical items can also be used in its original or in a slightly changed form in reference to this design.

In these gift items, the various enclosed edibles can be maintained at normal room temperature. Hence, powder in bags or liquids could be packed within the desired form. The normal form or consistency can also be reproduced in the desired form. These different types of foodstuffs can be packaged as desired according to the regulated food standards which can be maintained in this packaging.

A very advantageous aspect of this design is that as a girl-item, this particular practical object can be constructed of a single foodstuff. Moreover, this practical object can be created out of a foodstuff, for example, very simple technical objects at normal room temperature or normally hard foodstuffs such as chocolate, sweets of all kinds, chewing gum, etc. It is also possible that the outside wrapping can take this form. And can be filled with alcohol, coffee and the such. The edibles designed as the practical object can then be arranged into that certain packaging and offered as gifts. The receiver would have to examine closely the type of gift item. This surprise effect is built-in.

It is a suggested advantage that the packaging be at least partly made from a foodstuff. Also advantageous is that the total packaging be made from or include at least one foodstuff. The described advantages of these mentioned combinations is increased through the creative design and packaging.

Once again, a suggested advantage would be that the packaging would be at least partially transparent. On one hand, the cover of the object suggests a certain optical impression, on the other hand, general or personal information would be presented as well. Also, a suggestion of the design is that the transparent section can include information: general or personal. The information can also be applied to the outside of the packaging or it can be designed directly on the edible product or inserted in the package. The gift package can also include a first and a second sheet sized and shaped to correspond to the candy CD. The sheets sandwich the candy CD in the CD package.

With this creative characteristic, a new kind of gift item can be produced so that all demands on modem girl items are met: extensive variety and increased originality and surprise effect.

It is suggested that the object have a flat design; moreover, that the practical object be created as a CD. In this case, the well-known CD packaging in its original or slightly modified form should be used for the girl-item.

The above identified object is very easily produced and this idea can also be applied to a variety of similar practical items.

BRIEF DESCRIPTION OF THE DRAWINGS

Other further advantages of this design are brought out in the following description of the enclosed drawings, in which.

DESCRIPTION OF THE PREFERRED EMBODIMENT

Figure 1:
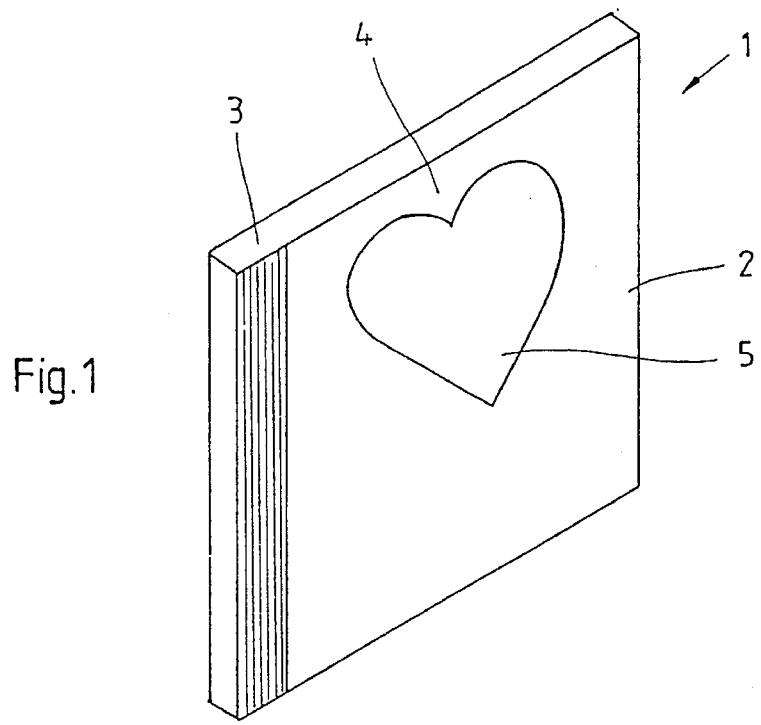
FIG. 1 is a perspective image of the presentation of this girl item.
Figure 2:
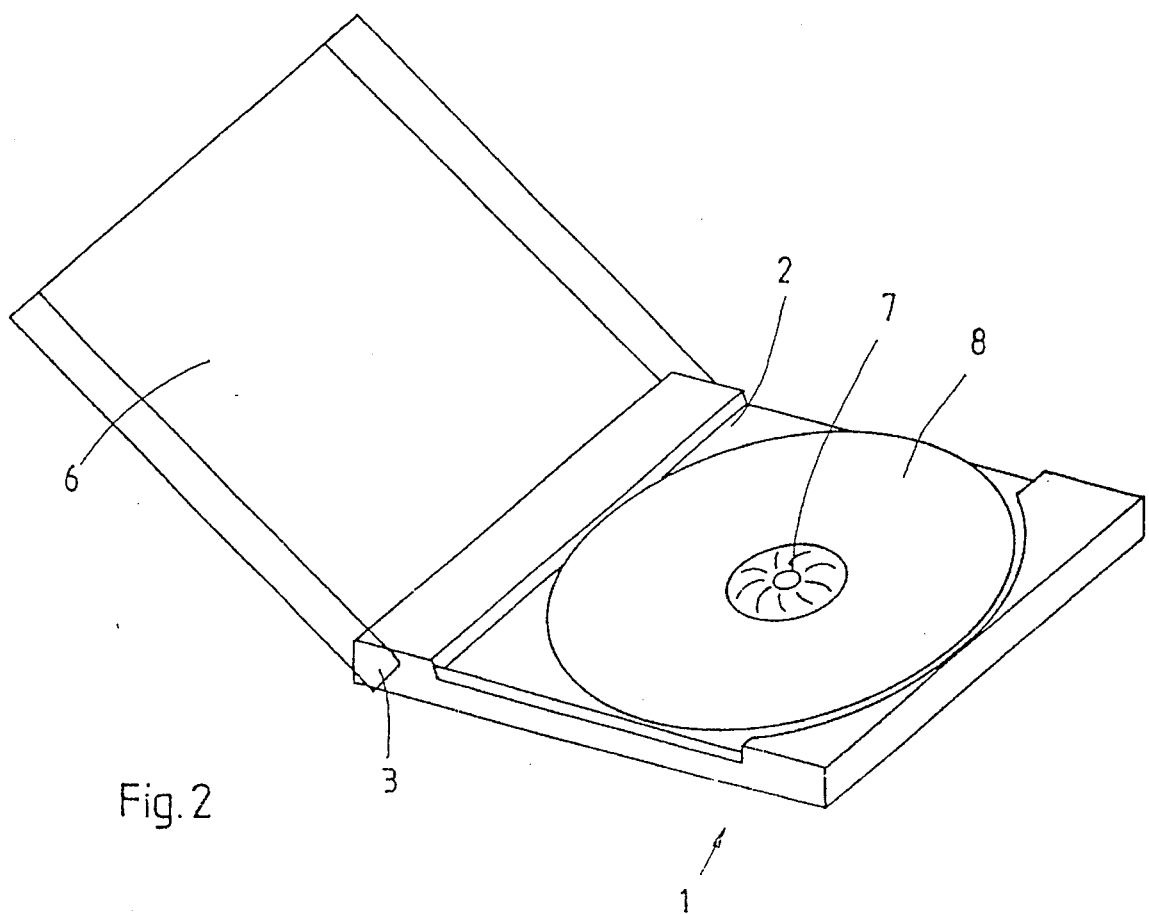
FIG. 2 is the image of FIG. 1 with the package opened.

In FIGS. 1 and 2 a CD is shown as the gift item of the enclosed design. The gift item 1 is created out of a CD case 2 which opens in the manner of a regular CD case. The CD case includes a base 3 and a cover 4 which are normally constructed out of transparent plastic so that an information label 5 can be placed within. General or personal information can be listed on the label: for the purpose of the present, greetings and such. On the back label 6 information can also be listed such as for example, a personal message, names, autographs and so on.

The CD case 2 functions in the same well-known way with the securing element 7 included in the center of the CD case. As in the enclosed description the disc 8 is constructed of a solid foodstuff, for example chewing gum, chocolate and such a normal room temperature. The disc 8 includes a central opening which surrounds the securing element 7 and is held in the base 3 in the manner of a normal CD.

In addition, the disc 8, which was manufactured in accordance with regulated food standards, and placed in the CD case can be decorated with labels and such. In addition certain elements, for example stickers and such, can be enclosed in the packaging.

The represented example of a CD as an image for a gift item also permits the inclusion of designed foodstuffs within certain other desired practical items.

As variations within the scope of the appended claims may be apparent to those skilled in the art, the foregoing description is set forth only for illustrative purposes and is not meant to be limiting. For example, although the invention is described for use with chewing gum or chocolate, the food stuff 8 can be any form of sweet, including, but not limited to, any type of candy, chocolate, waffles, etc.

We claim:

1. A gift package including a candy CD held in a CD holder; said candy CD being in the shape of an annular disc and having a central hole formed therein; said CD holder including a base and a cover, said base including a centrally located securing element sized and shaped to snugly fit in the hole formed in the candy to securely hold the candy CD in the base, said cover including a card, said card having a front surface and a back surface, said front surface being visible through said cover and containing thereon a preprinted message, said back surface being accessible for writing a personal message thereon, said cover including inwardly extending fingers to hold said card in said cover, said cover being transparent; and at least one sheet sized and shaped to correspond to said candy CD, said sheet arranged contiguous with the candy C.D.

2. A gift package including a candy CD held in a CD holder; said candy CD being in the shape of an annular disc and having a central hole formed therein; said CD holder including a base and a cover, said base including a centrally located securing element sized and shaped to snugly fit in the hole formed in the candy to securely hold the candy CD in the base, said cover including a card, said card having a front surface and back surface, said front surface being visible through said cover and containing thereon a preprinted message, said back surface being accessible for writing a personal message thereon, said cover including inwardly extending fingers to hold said card in said cover, said cover being transparent; a first sheet and a second sheet, said first and second sheets being sized and shaped to correspond to said candy CD, said first and second sheets sandwiching said candy CD in said candy CD holder.

3. The gift package of claim 2 including a paper disc which covers said candy CD, said paper disc having a message preprinted thereon.

* * * * *